United States Patent
Suzuki et al.

(10) Patent No.: US 9,168,819 B2
(45) Date of Patent: Oct. 27, 2015

(54) ELECTRICITY-STORAGE DEVICE ARRANGEMENT STRUCTURE OF VEHICLE

(71) Applicant: MAZDA MOTOR CORPORATION, Hiroshima (JP)

(72) Inventors: Seigo Suzuki, Hiroshima (JP); Sho Kawanari, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/461,206

(22) Filed: Aug. 15, 2014

(65) Prior Publication Data

US 2015/0075891 A1    Mar. 19, 2015

(30) Foreign Application Priority Data

Sep. 18, 2013   (JP) .................................. 2013-192609

(51) Int. Cl.
*B60R 16/04* (2006.01)
*B60K 1/04* (2006.01)
*B60K 6/40* (2007.10)

(52) U.S. Cl.
CPC ... *B60K 1/04* (2013.01); *B60K 6/40* (2013.01); *B60K 2001/0411* (2013.01); *Y10S 903/951* (2013.01)

(58) Field of Classification Search
CPC ....................................................... B60R 16/04

USPC ......................................................... 180/68.5
See application file for complete search history.

(56) References Cited

U.S. PATENT DOCUMENTS

| 6,827,168 B2 * | 12/2004 | Miyazaki ..................... 180/68.5 |
| 7,185,725 B2 * | 3/2007 | Iwasaka et al. .................. 180/90 |
| 8,474,559 B2 * | 7/2013 | Sogabe ........................ 180/68.5 |
| 2011/0210580 A1 * | 9/2011 | Sogabe .................... 296/187.09 |

FOREIGN PATENT DOCUMENTS

| JP | 2012-192890 A | 10/2012 |
| JP | 2012-236570 A | 12/2012 |

* cited by examiner

*Primary Examiner* — John Walters
*Assistant Examiner* — James Triggs
(74) *Attorney, Agent, or Firm* — Studebaker & Brackett PC

(57) ABSTRACT

An arrangement structure of an electricity-storage device of a vehicle, which comprises a pair of right-and-left front side frames, a dash panel partitioning a vehicle-compartment front portion at rear end portions of the front side frames, and a pair of front tires arranged on an outside, in a vehicle width direction, of the front side frames. The electricity-storage device is arranged on the outside, in the vehicle width direction, of the front side frame at a position between the dash panel and the front tire in a vehicle longitudinal direction such that the electricity-storage device overlaps a rear end portion of the front side frame (the kick-up portion, the protrusion portion) in a vehicle side view.

17 Claims, 8 Drawing Sheets

ELECTRICITY-STORAGE DEVICE ARRANGEMENT STRUCTURE OF VEHICLE

BACKGROUND OF THE INVENTION

The present invention relates to an arrangement structure of an electricity-storage device which is installed to a vehicle.

Conventionally, it is known that an electricity-storage device to store the electricity, such as a rechargeable battery (a nickel metal hydride rechargeable battery, a nickel-cadmium rechargeable battery, a lithium-ion rechargeable battery, or a lead-acid battery, for example) is installed to a vehicle, such as an automotive vehicle. It is also known that a capacitor is used, in place of the rechargeable battery, as the electricity-storage device.

The above-described electricity-storage device is arranged in an engine room or a motor room (in a case in which a motor for driving an electric vehicle is arranged) in many cases. However, since the electricity-storage device (the capacitor, particularly) does not have the superior heat resistance, this device is preferably arranged at a specific place in the engine room where the temperature is as low as possible. Japanese Patent Laid-Open Publication No. 2012-192890, for example, discloses that such an electricity-storage device is arranged at a front portion on the outside, in a vehicle width direction, of a front side frame.

Herein, it is preferable that a heavy object be positioned as close to the gravity center of the vehicle as possible, particularly be arranged within a wheel base between a front wheel and a rear wheel, considering the motional performances of the vehicle (the maneuverability and stability, the turning performance). In this sense, there is yet room for improvement in the structure like the one disclosed in the above-described patent document, in which the electricity-storage device that is a kind of the heavy object is arranged at a front end portion of the front side frame.

It may be considered that the electricity-storage device is arranged in back of a front tire so as to be located within the wheel base as described above. In this case, however, the arrangement position of the electricity-storage device is so close to the engine or the like that the electricity-storage device improperly receives the influence of heat as described above. Herein, it may be considered in order to solve this problem that a screen plate and a slit are provided at an engine-room-side face of a wheel house which covers over a front tire to properly exhaust the heat inside the engine room to the outside, as disclosed in Japanese Patent Laid-Open Publication No. 2012-236570, for example. In this case, however, the screen plate protrudes toward the inside of the engine room so greatly that the space efficiency may be deteriorated. Further, it may be difficult to apply this structure to a compact car, such as a sports car equipped with a wide tire, in which the engine room is not spacious.

SUMMARY OF THE INVENTION

The present invention has been devised in view of the above-described matters, and an object of the present invention is to provide an electricity-storage device arrangement structure of a vehicle which can properly restrain the electricity-storage device from receiving the heat influence of the engine or the like, arranging the electricity-storage device in back of the front tire.

According to the present invention, there is provided an electricity-storage device arrangement structure of a vehicle, comprising a pair of right-and-left front side frames extending in a vehicle longitudinal direction, a dash panel partitioning a vehicle-compartment front portion at rear end portions of the front side frames, a pair of front tires arranged on an outside, in a vehicle width direction, of the front side frames, and an electricity-storage device positioned on the outside, in the vehicle width direction, of any one of the front side frames, wherein the electricity-storage device is arranged at a position which is located between the dash panel and the front tire in a vehicle longitudinal direction such that at least a portion of the electricity-storage device overlaps a rear end portion of the front side frame in a vehicle side view.

According to the present invention, since the electricity-storage device is screened from an engine or a motor for driving (hereinafter, referred to as the "engine or the like") by the rear end portion of the front side frame, the electricity-storage device can be effectively restrained from receiving the heat influence of the engine or the like.

According to an embodiment of the present invention, a sub frame is provided below the front side frames, and the electricity-storage device is arranged such that at least a portion of an upper portion of the electricity-storage device overlaps the rear end portion of the front side frame in the vehicle side view and at least a portion of a lower portion of the electricity-storage device overlaps the sub frame in the vehicle side view. Thereby, a wide range of the electricity-storage device can be screened from the engine or the like. Particularly, this structure is superior in screening the electricity-storage device having a vertical-long shape.

According to another embodiment of the present invention, a portion of at least one of the front side frame and the sub frame which overlaps the electricity-storage device in the vehicle side view has a closed cross section. Thereby, the heat transmission of the above-described portion of the front side frame or the sub frame effectively decreases, so that the heat-screen effect of the electricity-storage device can be increased.

According to another embodiment of the present invention, the rear end portion of the front side frame includes a protrusion portion for sub frame's fixation where the rear end portion of the front side frame and the sub frame are fixed together, and the electricity-storage device is arranged such that the electricity-storage device further overlaps the protrusion portion in the vehicle side view. Thereby, the screen area from the engine or the like can be made properly wide by utilizing the fixation portion (protrusion portion) of the front side frame and the sub frame, so that the heat-screen effect of the electricity-storage device can be increased more effectively.

According to another embodiment of the present invention, the rear end portion of the front side frame includes a slant portion which slants rearward and downward along the dash panel, and the electricity-storage device is arranged such that the electricity-storage device further overlaps the slant portion in the vehicle side view. This structure is also superior in ensuring the wide screen area from the engine or the like, and particularly useful for the electricity-storage device having the vertical-long shape.

According to another embodiment of the present invention, a wheel house which covers over the front tire is provided, and the electricity-storage device is arranged in back of the wheel house such that at least a portion of the electricity-storage device overlaps the wheel house when viewed from the front. Thereby, the electricity-storage device is screened from the engine or the like not only at its vehicle-width-direction side but also at its front side, so that the electricity-storage device can be more effectively restrained from receiving the heat influence of the engine or the like.

Herein, the above-described arrangement of the electricity-storage device is useful particularly in a case in which the engine or the motor for driving is arranged between the pair of right-and-left front side frames and the electricity-storage device and the engine or the motor for driving are arranged so as to overlap each other in the vehicle longitudinal direction. That is, in a vehicle, such as a FR type of vehicle, in which the engine is displaced longitudinally at a rear side of the engine room, if the electricity-storage device is arranged in back of the front tire, the engine and the electricity-storage device are necessarily located close to each other, therefore the electricity-storage device may receive the influence of the heat of the engine. According to the above-described structure, however, the heat-screen effect of the electricity-storage device can be obtained effectively by utilizing the front side frame and the sub frame.

Herein, in the case in which the longitudinal-displacement engine is arranged between the pair of right-and-left front side frames, it is preferable that the electricity-storage device be arranged on the outside, in the vehicle width direction, of one of the front side frames which is positioned on an intake-pipe side of the engine. Since the electricity-storage device is arranged on the intake-pipe side of the engine where the amount of heat generation is relatively small, compared to an exhaust-pipe side of the engine, this structure is advantageous in restraining the electricity-storage device from receiving the heat influence of the engine.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
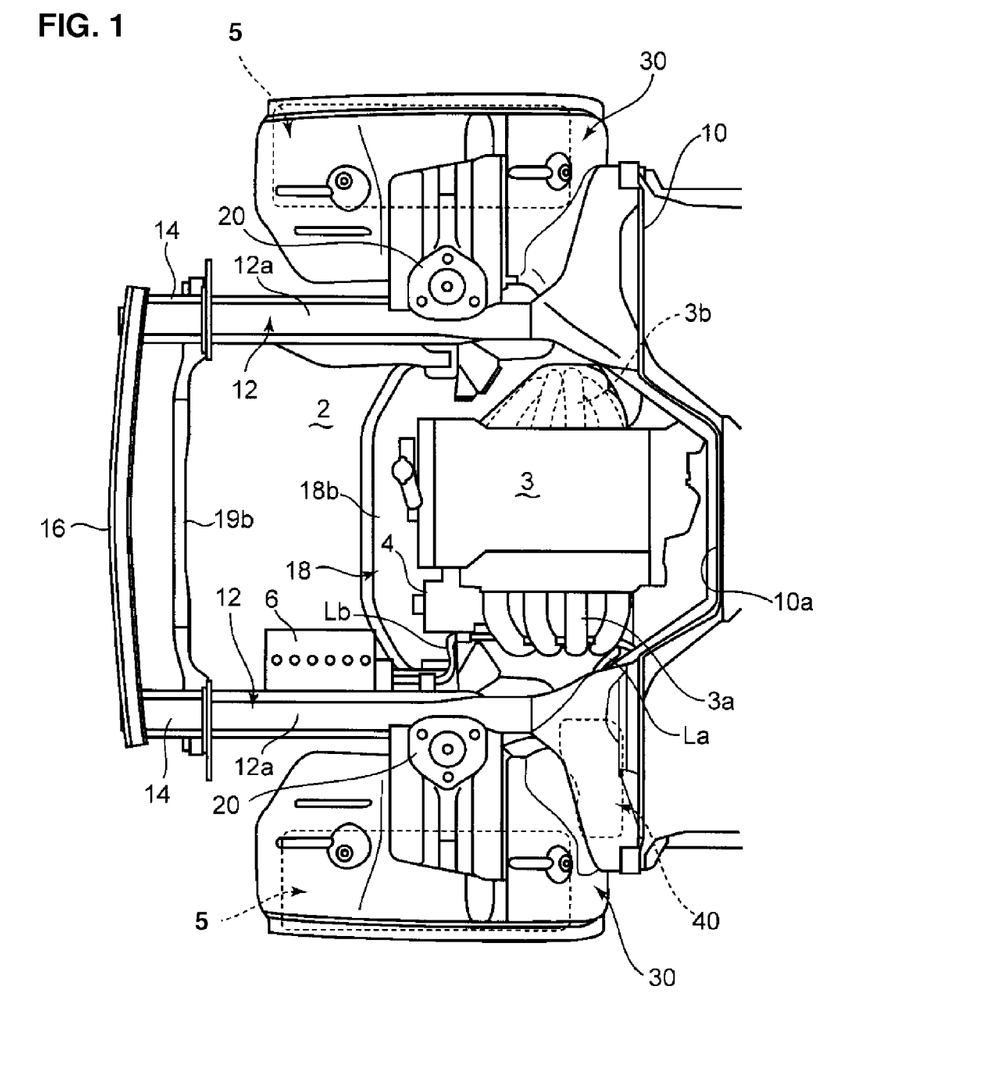
FIG. 1 is a plan view showing a front major portion of a vehicle, to which an arrangement structure of an electricity-storage device according to the present invention is applied.
Figure 2:
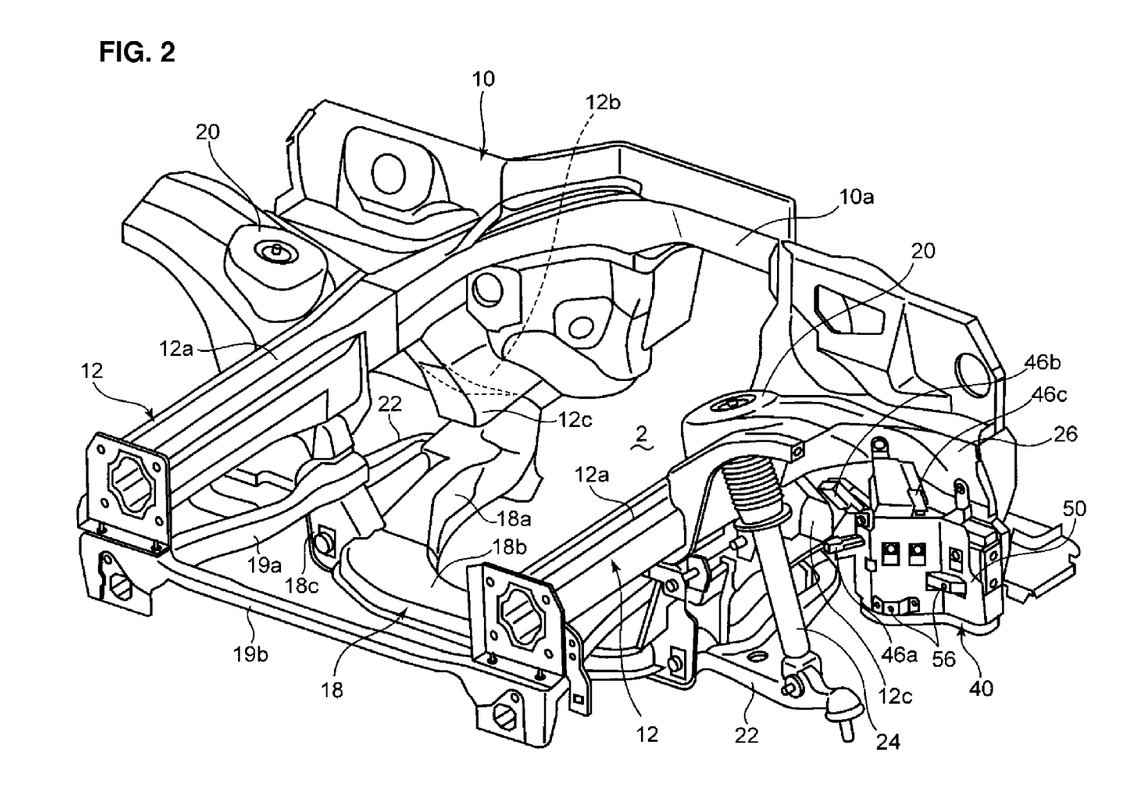
FIG. 2 is a perspective view showing the front major portion of the vehicle.

FIGS. 1 and 2 show a front major portion of a vehicle, to which an arrangement structure of an electricity-storage device according to the present invention is applied. A vehicle 1 comprises a dash panel 10 which partitions a vehicle-compartment front portion from an engine room 2, a pair of right-and-left front side frames 12 which extend in a longitudinal direction of the vehicle 1 at a position in front of the dash panel 10, and a floor panel, not illustrated, which is continuous from a lower end portion of the dash panel 10 and forms a bottom face portion of a vehicle compartment.

A recess portion 10a which projects toward a rearward side of the vehicle 1 is formed at a central portion, in a vehicle width direction, of the dash panel 10. A power train which comprises a longitudinal-displacement engine body, specifically an engine body 3 of an in-line 4-cylinder 4-cycle spark-ignition gasoline engine, and a transmission, not illustrated, which is connected to the engine body 3 is provided at a rear portion of the engine room 2. The engine body 3 is arranged in the engine room 2 in a state in which its rear end portion is positioned in the above-described recess portion 10a of the dash panel 10, specifically in a state in which a front end portion of the engine body 3 is positioned near a wheel axis of a front tire 5 and also an intake manifold 3a and an exhaust manifold 3b of the engine body 3 are positioned near a rear end of the front side frame 12 in a vehicle longitudinal direction. That is, the gravity center of the vehicle 1 is positioned as close to the center of a vehicle body of the vehicle 1 as possible, by arranging heavy objects of the engine body 3 and the others at a rearward position.

Figure 4:
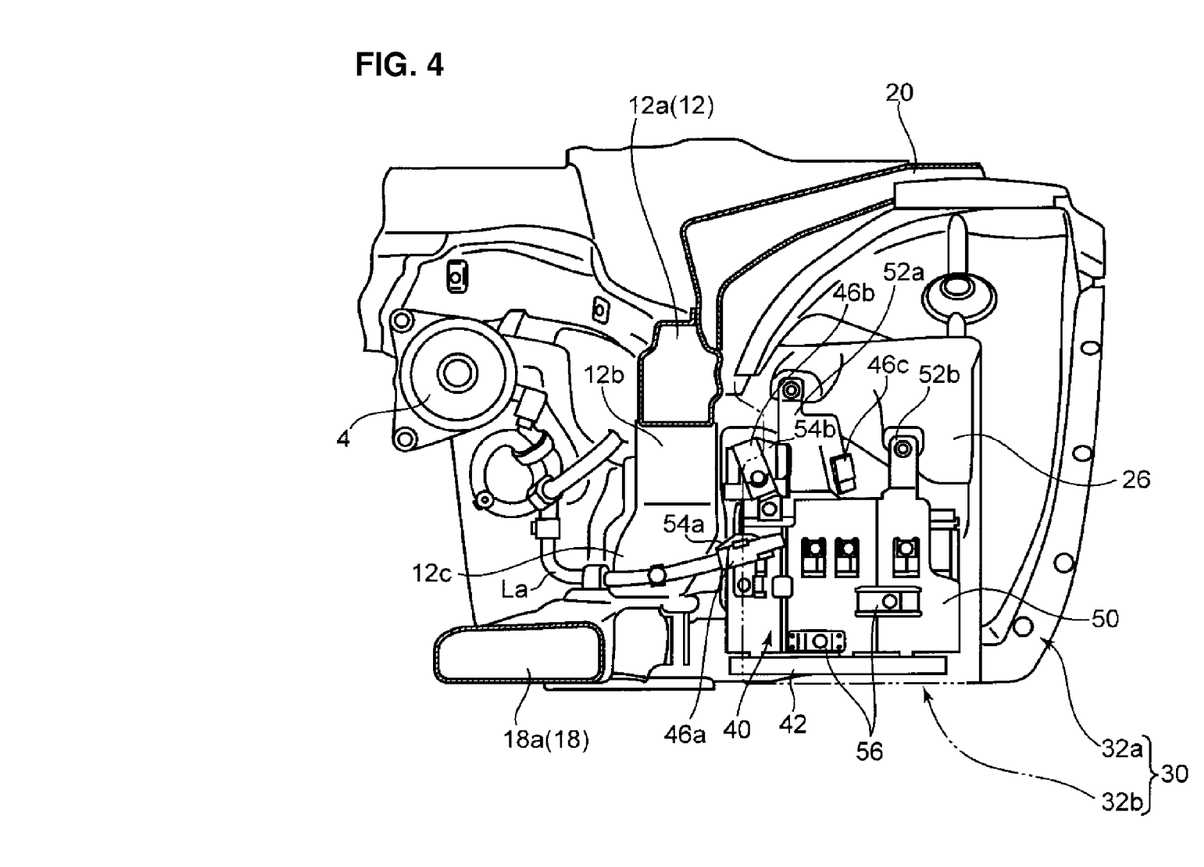
FIG. 4 is an elevational view showing the major portion of the vehicle around the attachment portion of the electricity-storage device.

The front side frame 12 is configured to have a closed cross section and comprises, in the side view, a horizontal portion 12a which extends substantially horizontally in the vehicle longitudinal direction and a kick-up portion 12b which extends from a rear end of the horizontal portion 12a, slanting rearward and downward, and connects to the floor frame, not illustrated (see FIG. 4). A pair of right-and-left crash cans 14 which are comprised of a cylindrical member which is made from metal or the like and project forward are provided at respective front end portions of the front side frames 12. A bumper reinforcement 16 which extends in the vehicle width direction is disposed at respective front end faces of the crash cans 14.

A sub frame 18 is provided below the front side frame 12, and a front suspension which comprises a lower arm and so on is supported at the sub frame 18.

The sub frame 18 comprises a pair of right-and-left first side sub frames 18a which extend in the vehicle longitudinal direction below the front side frames 12 and rear end portions of which are positioned near the dash panel 10, a first front sub cross member 18b which extends in the vehicle width direction, interconnecting front end portions of the first side sub frames 18a, a pair of vertical members 18c which extend upward from both end portions of the front sub cross member 18b, a pair of second side sub frames 19a which extend forward from respective middle portions of the vertical members 18c, and a second front sub cross member 19b which extends in the vehicle width direction, interconnecting front end portions of the second side sub frames 19a. Herein, the pair of right-and-left first side sub frames 18a and the first front sub cross member 18b are configured of an upper panel and a lower panel which are joined together such that they have substantially a closed cross section and are integrally formed as a whole.

Figure 3:
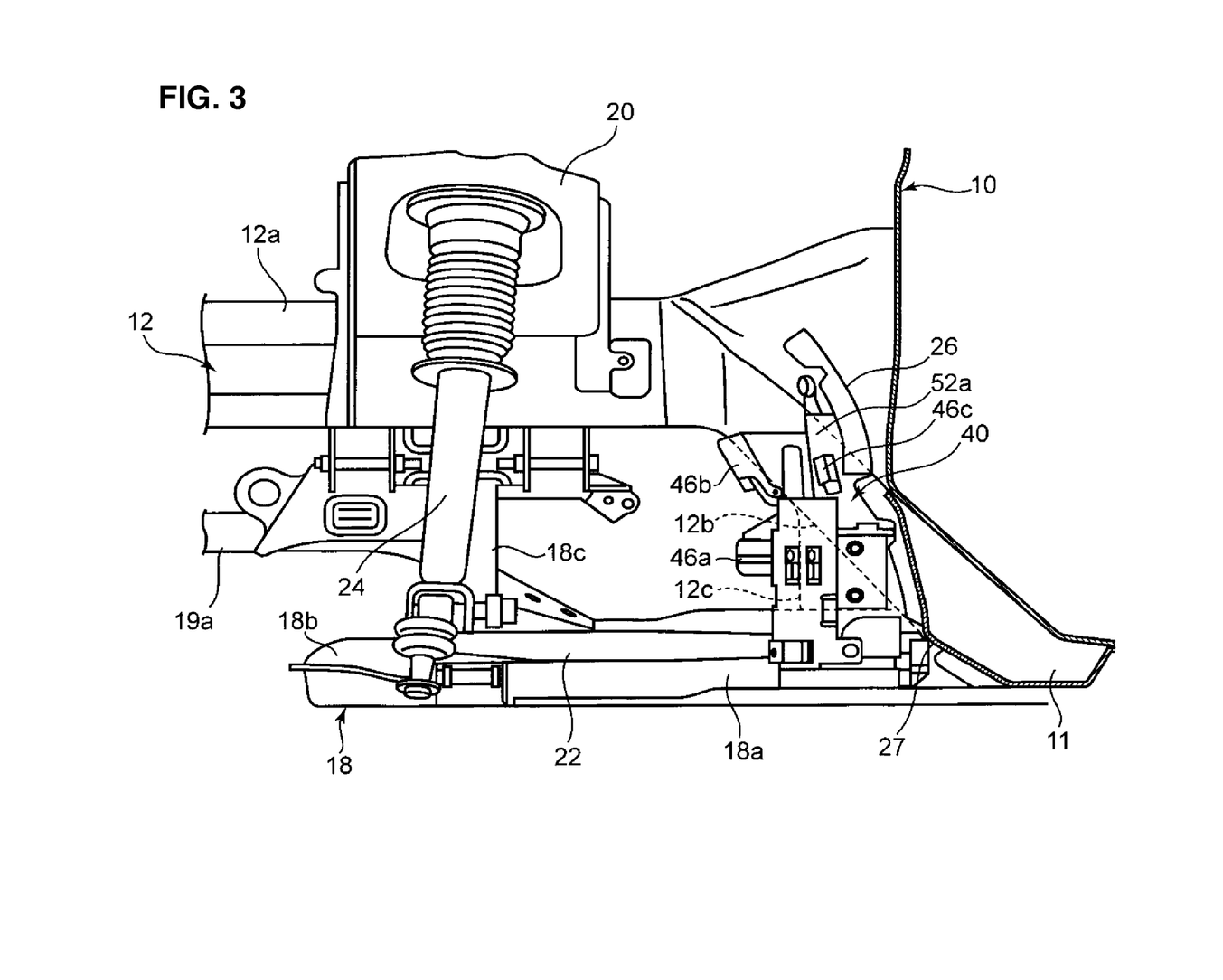
FIG. 3 is a side view showing a major portion of the vehicle around an attachment portion of the electricity-storage device.

The sub frame 18 is fixed to the front side frames 12 such that respective upper end portions of the vertical members 18c and respective front-end upper portions of the second side sub frames 19a are fastened to the horizontal portions 12a with bolts and respective rear end portions of the side sub frames 18a are fastened to the kick-up portions 12b with bolts. As shown in FIGS. 2 and 3, a protrusion portion 12c which protrudes forward is formed at a front face of each of the kick-up portions 12b, and the above-described rear end portions of the first side sub frames 18a are fixed to the front side frame 12 via the protrusion portions 12c. Each of the protrusion portions 12c has a flat lower face and a substantially triangular-shaped side face, and the first side sub frames 18a are fastened to the protrusion portions 12c with bolts in a state in which their upper faces contact the lower faces of the protrusion portions 12c. Thus, the first side sub frames 18a are fixed to the kick-up portions 12b slanting rearward and downward in a substantially horizontal position. Herein, reference character 11 in FIG. 3 denotes a torque box which is arranged between the kick-up portion 12b of the front side frame 12 and a side sill, not illustrated, which is positioned on a vehicle outside of the kick-up portion 12b.

A suspension tower 20 is fixed, by welding or the like, to a side face portion of a rear portion of the horizontal portion 12a of the front side frame 12 such that the suspension tower 20 extends upward from and on the vehicle outside of the horizontal portion 12a. Meanwhile, a lower arm 22 is supported at a specified portion of the first side sub frame 18a which corresponds to the suspension tower 20 so as to swing vertically, and a shock absorber 24 is provided between the lower arm 22 and the suspension tower 20. The front tire 5 is fixed to a wheel supporting member, not illustrated, which is pivotally supported at the lower arm 22, and the front tire 5 is covered by the wheel house 30 as shown in FIG. 1.

An electricity-storage device 40 is arranged on the vehicle outside (on the left side; on the lower side in FIG. 1) of the left-side front side frame 12 of the vehicle i.e., at a left and outside portion of the engine room 2, and at a position between the dash panel 10 and the front tire 5 in the vehicle longitudinal direction, more specifically, between the wheel house 30 and the torque box 11.

The electricity-storage device 40 primarily stores the electricity of the power generated by an alternator 4 attached to the engine body 3. This electricity-storage device 40 comprises a body 42 and an attaching bracket 50 for fixing the body 42 to the vehicle 1. The electricity-storage device 40 is fixed to the vehicle 1 by fastening the attaching bracket 50 to the vehicle 1 with bolts.

Figure 6:
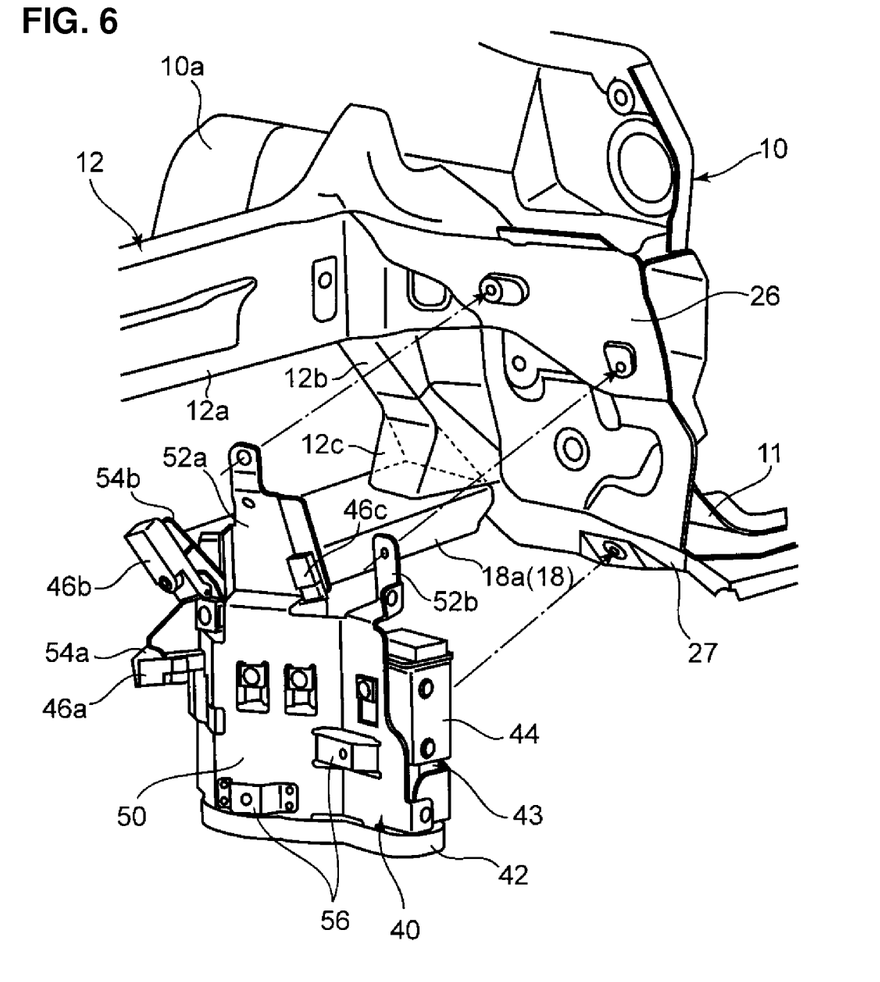
FIG. 6 is an explanatory diagram of an attachment structure of the electricity-storage device.
Figure 7:
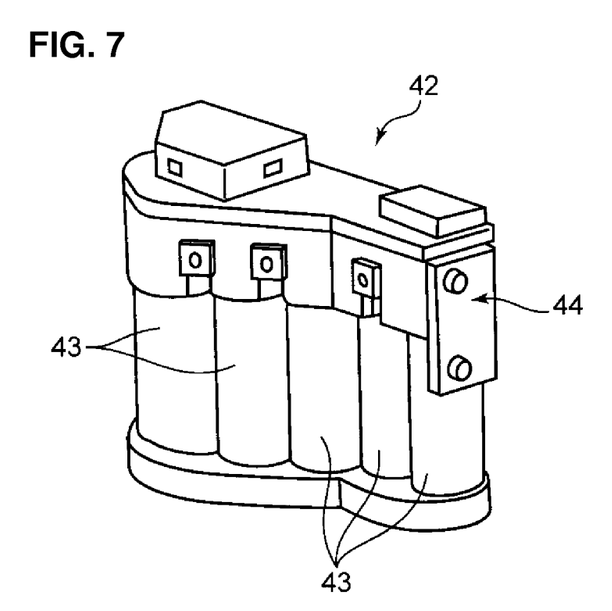
FIG. 7 is a perspective view showing a body of the electricity-storage device.

As shown in FIGS. 6 and 7, the body 42 of the electricity-storage device 40 includes plural vertical-long and cylindrical electricity-storage elements 43, each of which is comprised of a double-layer electric capacitor (hereinafter, referred to as "capacitor" simply), and an element holder 44 which holds the elements 43 as a unit such that the elements 43 stand upright in line. The attaching bracket 50 is a plate-shaped and metal-made member which holds the electricity-storage body 42 along the side face of the electricity-storage body 42, and has two upper flange portions 52a, 52b and one lower flange portion 52c. The upper flange portions 52a, 52b are fastened to an attaching panel 26 which is joined to a front-face side of the dash panel 10 with bolts. Meanwhile, the lower flange portion 52c is fastened to a front side panel 27 which forms a front face portion of the torque box 11 with bolts. Thus, the electricity-storage device 40 is fixed to the vehicle 1.

The electricity-storage device 40 fixed to the vehicle 1 as described above is arranged, as shown in FIG. 3, such that it overlaps the rear end portion of the front side frame 12, specifically the kick-up portion 12b, the protrusion portion 12c, and the rear end portion of the sub frame 18 (the first side sub frame 18a) in the vehicle side view. Accordingly, the electricity-storage device 40 is configured such that its upper portion is screened from the engine body 3 by the kick-up portion 12b including the protrusion portion 12c and its lower portion is screened from the engine body 3 by the first side sub frame 18a.

Figure 5:
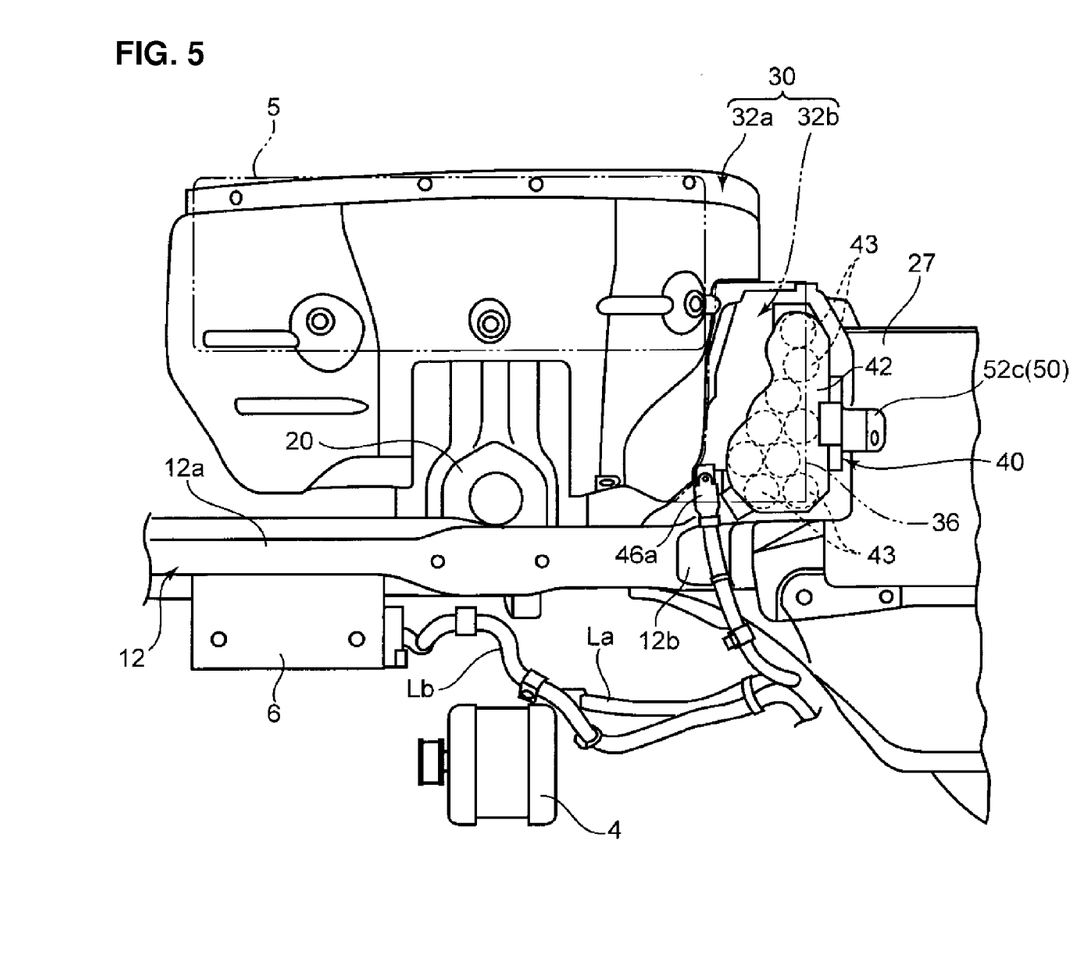
FIG. 5 is a bottom view showing the major portion of the vehicle around the attachment portion of the electricity-storage device.

The electricity-storage device 40 is equipped with a first connector 46a for connection to the alternator 4 and second and third connectors 46c, 46d for connection to a DC/DC convertor and others, not illustrated. The first connector 46a and the second connector 46b are held by flange portions for connector fixation 54a, 54b which are formed at the above-described attaching bracket 50 separately from the above-described flange portions 52a-52c. Thus, the first connector 46a is arranged at a specified position which is located on the inside, in the vehicle width direction, of the electricity-storage device 40, specifically, as shown in FIGS. 3-5, at a specified position which is located slightly forward from the kick-up portion 12b (the rear end portion of the front side frame 12) and above the first side sub frame 18a, in a state in which the first connector 46a is directed toward the inside in the vehicle width direction (illustration of the first side sub frame 18a is omitted in FIG. 5 for convenience). This first connector 46a is, as shown in FIG. 4, is arranged on the inside, in the vehicle width direction, of an attachment portion 56 of the wheel house 30 (a split portion 32b) which will be described later. Further, the second connector 46b is arranged at a specified position which is located above the first connector 46a and along the kick-up portion 12b in a state in which the second connector 46b is directed upward. Meanwhile, the third connector 46c is held at the above-described upper flange portion 52a which fixes the electricity-storage device 40 to the vehicle 1, and arranged on the outside, in the vehicle width direction, of the second connector 46b in a state in which the third connector 46c is directed upward.

As shown in FIG. 1, the alternator 4 is arranged at a specified position which is located forward, left and below the engine body 3 disposed in the engine room 2 and on the inside, in the vehicle width direction, of suspension tower 20 joined to the left-side front side frame 12. The alternator 4, which is an auxiliary component fixed to a side face or the like of the engine body 3, generates the power when receiving a rotational drive force from the engine body 3 via a drive belt. A harness La projects from the alternator 4 and is coupled to the first connector 46a of the electricity-storage device 40. The harness La is, as shown in FIGS. 4 and 5, configured to extend rearward near the front side frame 12 and substantially in parallel to the horizontal portion 12a of the front side frame 12, crossing a front end of the protrusion portion 12c of the kick-up portion 12b. Thus, the harness La projects substantially straightly from the inside, in the vehicle width direction, of the left-side front side frame 12 toward the outside, in the vehicle width direction, of the left-side front side frame 12, and is coupled to the first connector 46a of the electricity-storage device 40. Accordingly, the alternator 4 and the electricity-storage device 40 are electrically connected via the harness La, and the power generated by the alternator 4 during the deceleration of the vehicle 1 is stored at the electricity-storage device 40 via the harness La. Herein, harnesses to couple an inverter (a power control device), not illustrated, and the DC/DC convertor to the electricity-storage device are coupled to the second and third connectors 46b, 46c of the electricity-storage device 40, which is not illustrated in FIG. 4 and other figures.

Further, a lead-acid battery 6 is disposed at an inside face, in the vehicle width direction, of a specified portion of the left-side front side frame 12 which is located slightly in front of the suspension tower 20. This lead-acid battery 6 is connected to the DC/DC convertor and other electric components via a harness Lb.

The electricity-storage device 40 is, as described above, arranged between the wheel house 30 (the left-side wheel house 30) and the torque box 11, so that the electricity-storage device 40 is covered by the wheel house 30 from the front side.

Figure 8:
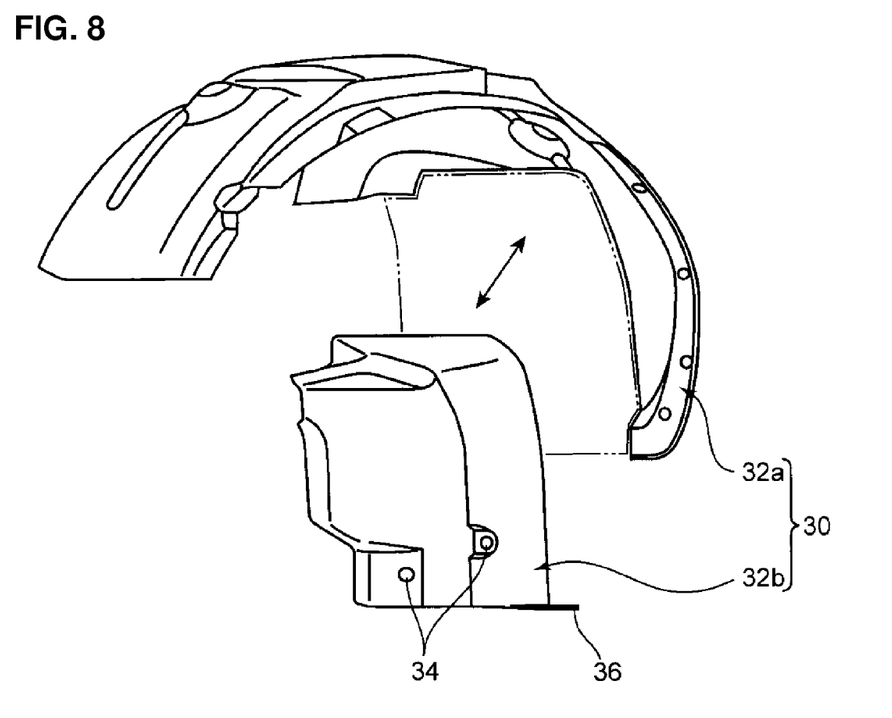
FIG. 8 is a perspective view showing a wheel house.

As shown in FIG. 8, the left-side wheel house 30 is comprised of a wheel house body portion 32a and a split portion 32b which is provided separately from the wheel house body portion 32a and positioned in front of the electricity-storage device 40. The wheel house body portion 32a and the split portion 32b constitute together an arch shape covering over the front tire 5.

As shown in FIG. 4, a border line (a split line) of the wheel house body portion 32a and the split portion 32b extends, in the elevational view (when viewed from the vehicle front side), substantially horizontally from a vehicle-inside end portion of the wheel house 30 at a specified position located above the electricity-storage device 40, and extends downward along the wheel arch at a specified position located slightly on the outside, in the vehicle width direction, of the electricity-storage device 40, and then reaches a rear-side lower end portion of the wheel house 30. That is, the wheel house 30 is configured such that an entire part of the electricity-storage device 40 can be exposed to the side of the front tire 5 when the split portion 32b is removed as shown.

The wheel house body portion 32a of the wheel house 30 is fixed to the vehicle 1 by being fastened to a fender panel, not illustrated, and the suspension tower 20 with bolts, for example. Meanwhile, the split portion 32b is fixed to the wheel house 30a by inserting its upper-side edge portion and its vehicle-inside edge portion along a periphery of the wheel house body portion 32a and additionally by fastening with bolts. Further, the split portion 32b is fixed to the vehicle 1 via the electricity-storage device 40 and others by fastening a slightly-lower part of the center of the split portion 32b to the electricity-storage device 40 with bolts. Specifically, as shown in FIGS. 6 and 8, plural attachment holes 34 are formed at the slightly-lower part of the center of the split portion 32b, whereas plural attachment portions 56 equipped with bolt holes which correspond to the above-described attachment holes 34 are formed at a front face of the attaching bracket 50 of the electricity-storage device 40. Thus, the split portion 32b is fastened to the electricity-storage device 40 with bots at the slightly-lower part of the center thereof.

Herein, a plate-shaped under-guard portion 36 is formed at a lower end portion of the above-described split portion 32b such that it extends rearward substantially horizontally and covers the electricity-storage device 40 from below, as shown in FIGS. 5 and 8. Thereby, the electricity-storage device 40 is protected from jumping stones or the like.

While the structure of the vehicle 1, to which the present invention is applied, has been described, the following advantages are provided according to the vehicle 1.

First, the electricity-storage device 40 of the vehicle 1 is arranged at the position between the front tire 5 and the dash panel 10, that is, within a wheel base between the front tire 5 and the rear tire. Accordingly, the electricity-storage device 40 can be arranged as close to the gravity center of the vehicle 1 as possible, which contributes to improvements of the motional performances of the vehicle (the maneuverability and stability, the turning performance).

In this case, since the engine body portion 3 of the vehicle 1 is the engine displaced longitudinally in the engine room 2 and arranged in the recess portion 10a formed at the dash panel 10, there is a concern that the electricity-storage device 40 may receive the heat influence of the engine body 3. However, the electricity-storage device 40 of the vehicle 1 is arranged on the side of the intake manifold 3a (i.e., on the intake-pipe side) of the engine body 3 which has a relatively low temperature. Moreover, the electricity-storage device 40 is arranged such that it overlaps the rear end portion of the front side frame 12, i.e., the kick-up portion 12b including the protrusion portion 12c and the first side sub frame 18a (the sub frame 18), in the vehicle side view, so that the electricity-storage device 40 is screened from these frames 12, 18. Accordingly, even if the electricity-storage device 40 is arranged in back of the front tire 5 and the engine body 3 is disposed beside the electricity-storage device 40 as described above, the electricity-storage device 40 may not receive the heat influence so much. Therefore, the above-described vehicle 1 has an advantage that the electricity-storage device 40 can be restrained from receiving the heat influence of the engine body 3 with a reasonable structure utilizing the front side frame 12 and the sub frame 18, arranging the electricity-storage device 40 in back of the front tire 5.

Particularly, since the front side frame 12 or the sub frame 18 are configured to have the closed cross section as described above, the heat transmission from the engine body 3 toward the electricity-storage device 40 is effectively shut off. Accordingly, the superior heat shut-off effect can be provided.

Further, since the front side of the electricity-storage device 40 is covered by the wheel house 30, the electricity-storage device 40 is screened from the engine body 3 not only at its vehicle-width-direction side but also at its front side. Accordingly, the electricity-storage device 40 can be more effectively restrained from receiving the heat influence of the engine body 3.

Moreover, since the wheel house 30 of the vehicle 1 is comprised of the wheel house body portion 32a and the split portion 32b, the entire part of the electricity-storage device 40 can be exposed easily by removing the split portion 32b. Therefore, even if the electricity-storage device 40 is arranged in back of the wheel house 30 so as to be covered by the wheel house 30 from the front side, the wiring of the electricity-storage device 40 can be facilitated, so that the appropriate assembling and maintenance of the vehicle 1 can be ensured. That is, if the wheel house 30 has an integral structure (the wheel house body portion 32a and the split portion 32b are configured as an integral member), since the electricity-storage device 40 is covered by the wheel house 30 from the front side when the electricity-storage device 40 is assembled and the wheel house 30 is fixed accordingly, it may become difficult to couple the harness La of the alternator 4 and the electricity-storage device 40 when the engine body 3 is installed in the engine room 2 subsequently. In this case, it may be considered that the engine 3 is assembled previously, and after the wiring, the wheel house 30 is assembled. However, it is general that the wheel house 30 is previously assembled to the vehicle 1 before installing the engine body 3 from the works including wiring of other harnesses and the like. Consequently, if the order of the above-described work steps is exchanged, the assembling may be deteriorated and also the facilities change may be caused improperly. According to the above-described vehicle 1 which uses the wheel house 30 having the above-described split structure, however, as long as the electricity-storage device 40 is fixed to the vehicle 1 and only the wheel house body portion 32a is assembled to the vehicle 1 first, even when the engine body 3 is installed in the engine room 2 subsequently, the harness La of the alternator 4 can be easily coupled to the electricity-storage device 40 (the first connector 46a). Since the split portion 32b is assembled after this, the electricity-storage device 40 can be easily covered by the wheel house 30. Further, the electricity-storage device 40 can be accessed from the outside easily by detaching the split portion 32b at need. Thus, the electricity-storage device 40 can be covered by the wheel house 30 from the front side and the wiring of the electricity-storage device 40 can be facilitated, so that the appropriate assembling and maintenance of the vehicle 1 can be ensured.

Also, since the electricity-storage device 40 of the vehicle 1 is arranged on the outside, in the vehicle width direction, of the left-side front side frame 12 which is closer to the alternator 4, the distance between the alternator 4 and the electricity-storage device 40 is small. Accordingly, the harness La is relatively short, so that the wiring of the harness La can be made easy. Additionally, the power loss which is caused by the electric resistance may be decreased properly because of this short length of the harness La, so that the regenerative efficiency can be improved. Further, the first connector for alternator connection 46a is arranged on the inside, in the vehicle width direction, of the attachment portion 56 of the split portion 32b at the specified position which is located in front of the kick-up portion 12b of the front side frame 12 and above the first side sub frame 18a in a state in which the first connector 46a is directed toward the inside in the vehicle width direction. Accordingly, the harness La can be easily connected (coupled) to the electricity-storage device 40 from below in a state in which the vehicle 1 is lifted up, for example, thereby improving the working efficiently.

Further, since the split portion 32b of the wheel house 30 is fastened to the wheel house body portion 32a at its upper edge portion and its outside edge portion by bolts and additionally is fixed to the electricity-storage device 40 (the attaching bracket 50) at the slightly-lower part of its center, the split portion 32b can be attached or detached through a relatively easy work and also fixed to the vehicle 1 stably. That is, in a case in which only the split portion 32b is fixed to the wheel house body portion 32a, the lower edge portion and the inside edge portion of the split portion 32b are not fixed (free), so that the split portion 32b may vibrate unstably (shake) during the vehicle traveling. However, according to the above-described structure in which the split portion 32b is fixed to the electricity-storage device 40 (the attaching bracket 50), the above-described vibration can be restrained, so that the split portion 32b can be stable.

Herein, the above-described plural electricity-storage elements 43 included in the electricity-storage device 40 are, as shown in FIG. 5, arranged in one row on the outside in the vehicle width direction and substantially in two rows on the inside in the vehicle width direction in the state in which the electricity-storage device 40 is fixed to the vehicle 1, which has not been described above. Thus, a rear side face of the electricity-storage device 40 is configured to slightly slant forward and inward in the plan view. Thereby, the electricity-storage device 40 can be compactly arranged in back of the front tire 5, avoiding any improper interference of the electricity-storage device 40 with the front tire 5 which has been steered.

Herein, the vehicle 1 is merely one example of the preferred embodiment of the vehicle, to which the arrangement structure of the electricity-storage device according to the present invention is applied, and the concrete structure of the vehicle 1 can be modified within the scope of the claimed invention.

For example, while the electricity-storage device 40 is arranged so as to overlap the kick-up portion 12b (including the protrusion portion 12c) and the rear end portion of the first side sub frame 18a in the vehicle side view in the above-described embodiment, this device 40 may be configured so as to overlap the kick-up portion 12b only in a case in which the electricity-storage device 40 is small sized.

Also, while the specific portions of the front side frame and the like which overlap the electricity-storage device 40 have the closed cross section because the front side frame 12 and the sub frame 18 (the first side sub frame 18a) are configured to have the closed cross section as a whole in the above-described embodiment, the above-described specific portions may be configured to have a different shape from the closed-cross-section shape. However, the closed-cross-section shape is superior in providing the heat-screen effect.

Further, while the wheel house 30 of the above-described embodiment is configured such that the entire part of the electricity-storage device 40 is exposed to the side of the front tire 5 when the split portion 32b is removed, this member 30 may be configured such that only part of the electricity-storage device 40, which is a limited area necessary for attaching and detaching the harness La, i.e., a small area including the connectors 46a-46c, is exposed. And, the specific location or position (state) of the connectors 46a-46c of the electricity-storage device 40 are not limited to the above-described embodiment, any modification is applicable so as to provide smoother connection works of the harness La and the like.

Moreover, while the split portion 32b of the wheel house 30 is fastened to the electricity-storage device 40 with the bolts in the above-described embodiment, this member 32b may be fixed to another portion than the electricity-storage device 40 (to the kick-up portion 12b or the like, for example). Herein, since the spilt portion 32b is possibly fixed at its central area or its vicinity in the case in which the split portion 32b is fastened to the electricity-storage device 40 like the embodiment, the attaching/detaching work of the split portion 32b can be improved.

Also, while the example that the present invention is applied to the vehicle (FR type of vehicle) with the longitudinal-displacement engine body 3 arranged in the engine room 2 has been described in the above-described embodiment, the present invention is also applicable to a type of vehicle (FF type of vehicle) in which in a lateral-displacement engine body is arranged in the engine room. Herein, in the case in which the lateral-displacement engine body is arranged in the engine room, the engine body as the heat source is disposed at a relatively front side in the engine room. Accordingly, in a case in which the electricity-storage device is arranged in back of the front tire, the electricity-storage device and the engine body are positioned relatively apart from each other, so that the electricity-storage device may not receive the heat influence so much. Therefore, the present invention is particularly effective for the type of vehicle 1 in which the electricity-storage device 40 does not receive the heat influence of the engine body 3, i.e., the longitudinal-displacement engine body 3 is arranged in the engine room 2 like the above-described embodiment, because the electricity-storage device 40 and the engine body 3 are close to each other when the electricity-storage device 40 is arranged in back of the front tire 5.

Additionally, the above-described vehicle 1 is applicable to another type of vehicle of an electric vehicle or a hybrid vehicle which is equipped with a motor for driving, than the vehicle which travels only with the engine body 3 as a drive source. According to this constitution, the electricity-storage device is arranged in back of the front tire, whereas it is possibly restrained by a reasonable structure that the electricity-storage device receives the heat influence of the motor for driving.

What is claimed is:

1. An electricity-storage device arrangement structure of a vehicle, comprising:
a pair of right-and-left front side frames extending in a vehicle longitudinal direction, each of which comprises a horizontal portion extending substantially horizontally and a kick-up portion extending from a rear end of the horizontal portion rearward and downward;

a dash panel partitioning a vehicle-compartment front portion from a drive-source room in which a drive source of the vehicle is provided at rear end portions of the front side frames;

a pair of front tires arranged on an outside, in a vehicle width direction, of the front side frames;

a pair of wheel houses covering over the front tires; and an electricity-storage device positioned on the outside, in the vehicle width direction, of any one of the front side frames, wherein said electricity-storage device is arranged at a position which is located outside of the drive-source room and between said dash panel and said wheel house of the front tire in a vehicle longitudinal direction such that at least a portion of the electricity-storage device overlaps the kick-up portion of said front side frame in a vehicle side view, whereby the electricity-storage device is screened from the drive source provided in the drive-source room by the kick-up portion of the front side frame.

2. The electricity-storage device arrangement structure of the vehicle of claim 1, wherein a sub frame is provided below said front side frames, and said electricity-storage device is arranged such that at least a portion of an upper portion of the electricity-storage device overlaps a rear end portion of the front side frame in the vehicle side view and at least a portion of a lower portion of the electricity-storage device overlaps said sub frame in the vehicle side view.

3. The electricity-storage device arrangement structure of the vehicle of claim 2, wherein a portion of at least one of said front side frame and said sub frame which overlaps said electricity-storage device in the vehicle side view has a closed cross section.

4. The electricity-storage device arrangement structure of the vehicle of claim 2, wherein said kick-up portion of the front side frame includes a protrusion portion for sub frame's fixation where the rear end portion of the front side frame and the sub frame are fixed together, and said electricity-storage device is arranged such that the electricity-storage device further overlaps said protrusion portion in the vehicle side view.

5. The electricity-storage device arrangement structure of the vehicle of claim 3, wherein said kick-up portion of the front side frame includes a protrusion portion for sub frame's fixation where the rear end portion of the front side frame and the sub frame are fixed together, and said electricity-storage device is arranged such that the electricity-storage device further overlaps said protrusion portion in the vehicle side view.

6. The electricity-storage device arrangement structure of the vehicle of claim 1, wherein said electricity-storage device is arranged in back of said wheel house such that at least a portion of the electricity-storage device overlaps said wheel house when viewed from the front.

7. The electricity-storage device arrangement structure of the vehicle of claim 5, wherein and said electricity-storage device is arranged in back of said wheel house such that at least a portion of the electricity-storage device overlaps said wheel house when viewed from the front.

8. The electricity-storage device arrangement structure of the vehicle of claim 1, wherein said electricity-storage device is arranged in back of said wheel house such that at least a portion of the electricity-storage device overlaps said wheel house when viewed from the front.

9. The electricity-storage device arrangement structure of the vehicle of claim 1, wherein an engine or a motor for driving, which is said drive source of the vehicle, is arranged between said pair of right-and-left front side frames, and said electricity-storage device and said engine or said motor for driving are arranged so as to overlap each other in the vehicle longitudinal direction.

10. The electricity-storage device arrangement structure of the vehicle of claim 5, wherein an engine or a motor for driving, which is said drive source of the vehicle, is arranged between said pair of right-and-left front side frames, and said electricity-storage device and said engine or said motor for driving are arranged so as to overlap each other in the vehicle longitudinal direction.

11. The electricity-storage device arrangement structure of the vehicle of claim 1, wherein an engine or a motor for driving, which is said drive source of the vehicle, is arranged between said pair of right-and-left front side frames, and said electricity-storage device and said engine or said motor for driving are arranged so as to overlap each other in the vehicle longitudinal direction.

12. The electricity-storage device arrangement structure of the vehicle of claim 9, wherein said engine is a longitudinal-displacement engine, and said electricity-storage device is arranged on the outside of one of the front side frames which is positioned on an intake-pipe side of said engine.

13. The electricity-storage device arrangement structure of the vehicle of claim 10, wherein said engine is a longitudinal-displacement engine, and said electricity-storage device is arranged on the outside of one of the front side frames which is positioned on an intake-pipe side of said engine.

14. The electricity-storage device arrangement structure of the vehicle of claim 11, wherein said engine is a longitudinal-displacement engine, and said electricity-storage device is arranged on the outside of one of the front side frames which is positioned on an intake-pipe side of said engine.

15. An electricity-storage device arrangement structure of a vehicle, comprising:

a pair of right-and-left front side frames extending in a vehicle longitudinal direction;

a dash panel partitioning a vehicle-compartment front portion at rear end portions of the front side frames;

a pair of front tires arranged on an outside, in a vehicle width direction, of the front side frames;

a sub frame provided below said front side frames;

a pair of wheel houses covering over said front tires;

a longitudinal-displacement engine arranged between said pair of right-and-left front side frames; and an electricity-storage device positioned on the outside, in the vehicle width direction, of one of the front side frames which is positioned on an intake-pipe side of said engine, wherein said electricity-storage device is arranged at a position which is located between said dash panel and said front tire in a vehicle longitudinal direction such that at least a portion of an upper portion of the electricity-storage device overlaps a rear end portion of one of said front side frames and at least a portion of a lower portion of the electricity-storage device overlaps said sub frame in a vehicle side view, respective portions of said front side frame and said sub frame which respectively overlap said electricity-storage device in the vehicle side view have a closed cross section, respectively, said rear end portion of the front side frame includes a protrusion portion for sub frame's fixation where the rear end portion of the front side frame and the sub frame are fixed together and a slant portion which slants rearward and downward along said dash panel, and said electricity-storage device is arranged such that the electricity-storage device overlaps said protrusion portion and said slant portion of the front side frame in the vehicle side view, and said electricity-storage device is arranged in back of said wheel house such that at least a portion of the electricity-storage device overlaps said wheel house when viewed from the front.

16. An electricity-storage device arrangement structure of a vehicle, comprising:

a pair of right-and-left front side frames extending in a vehicle longitudinal direction;

a dash panel partitioning a vehicle-compartment front portion at rear end portions of the front side frames;

a pair of front tires arranged on an outside, in a vehicle width direction, of the front side frames;

a sub frame is provided below said front side frames; and an electricity-storage device positioned on the outside, in the vehicle width direction, of any one of the front side frames, wherein said electricity-storage device is arranged at a position which is located between said dash panel and said front tire in a vehicle longitudinal direction such that at least a portion of an upper portion of the electricity-storage device overlaps a rear end portion of said front side frame in a vehicle side view and at least a portion of a lower portion of the electricity-storage device overlaps said sub frame in the vehicle side view.

17. An electricity-storage device arrangement structure of a vehicle, comprising:

a pair of right-and-left front side frames extending in a vehicle longitudinal direction;

a dash panel partitioning a vehicle-compartment front portion at rear end portions of the front side frames;

a pair of front tires arranged on an outside, in a vehicle width direction, of the front side frames; and an electricity-storage device positioned on the outside, in the vehicle width direction, of any one of the front side frames, wherein said electricity-storage device is arranged at a position which is located between said dash panel and said front tire in a vehicle longitudinal direction such that at least a portion of the electricity-storage device overlaps a rear end portion of said front side frame in a vehicle side view, an engine or a motor for driving is arranged between said pair of right-and-left front side frames, and said electricity-storage device and said engine or said motor for driving are arranged so as to overlap each other in the vehicle longitudinal direction.

* * * * *